Feb. 10, 1953 R. A. GAISER 2,628,299
CONNECTION FOR ELECTRICALLY CONDUCTING FILMS
Filed Dec. 31, 1949

Inventor
Romey A. Gaiser
By
Nobbe & Swope
Attorneys

Patented Feb. 10, 1953

2,628,299

UNITED STATES PATENT OFFICE 2,628,299

CONNECTION FOR ELECTRICALLY CONDUCTING FILMS

Romey A. Gaiser, Toledo, Ohio, assignor to Libbey-Owens-Ford Glass Company, Toledo, Ohio, a corporation of Ohio Application December 31, 1949, Serial No. 136,300

10 Claims. (Cl. 201—63)

The present invention relates to electrically conducting films on vitreous articles, and more particularly to an improved connection between such films and the electrodes through which electrical energy is applied to the films.

Electrically conducting films, and especially transparent, electrically conducting films of tin oxide on glass sheets or plates, have recently come into rather wide use. To date, glass sheets filmed in this manner have found their principal utility as elements of de-icing windows or windshields in automobiles and aircraft, the electrically conducting film being supplied with electrical energy, through suitable electrodes, sufficient to heat the glazing unit to a temperature at which ice or frost will be removed from, or its formation prevented on, the surface of the exposed face of the unit.

The electrical connection between the film and electrodes in an article of this character has heretofore preferably been obtained by first securing the electrodes to the glass and then applying the electrically conducting film to the glass in a manner to contact the electrodes.

However, considerable difficulty has been experienced with connection made in this way due to the arcing which occurs at the juncture or meeting line of the electrically conducting film and the electrodes, or at the electrode-film interface, and which arcing always results in failure of the unit.

A number of theories have been advanced as to the cause of this arcing, and numerous procedures were tried in an effort to overcome it. However, prior to the present invention, no completely practicable and satisfactory way of overcoming the difficulty had been found.

Now, however, I have discovered that arcing at the juncture of the electrically conducting film and the electrode, with the resultant failure of the unit, can be positively prevented by the provision of a metallic overlay on the film which bridges the meeting line of the film and electrode.

It is therefore an important object of the present invention to provide a satisfactory electrical connection between an electrode of relatively low resistivity located on a surface of a vitreous article and a film of electrically conducting material of relatively high resistivity also on the surface of the vitreous article and in contact with the electrode.

Another object is the provision, in the vitreous article having a surface film of an electrically conducting material and an electrode for supplying electrical current to said coating, of a coating of silver overlaying the electrode and the electrically conducting film at the juncture thereof.

Another object is the provision, in an article of the above general character and in which the electrode is of relatively greater thickness than the electrically conducting film, of a fillet of metal in the angle formed by the juncture of the film with the electrode.

Another object is to provide, in such an article where the electrically conducting film is thinner in the area adjacent the meeting line of the film and electrode, a metallic member bridging the gap between the electrode and the portion of the film that is of full thickness.

Still another object is the provision, in a unit comprising a sheet of glass, an electrode fired on a surface of the glass sheet, and an electrically conducting film of tin oxide on the same surface, of a layer of air-dry silver overlying the electrode and an adjacent portion of the electrically conducting film on the glass.

Other objects and advantages of the invention will become more apparent during the course of the following description, when taken in connection with the accompanying drawings.

In the drawing, wherein like numerals are employed to designate like parts throughout the same:

Figure 2:
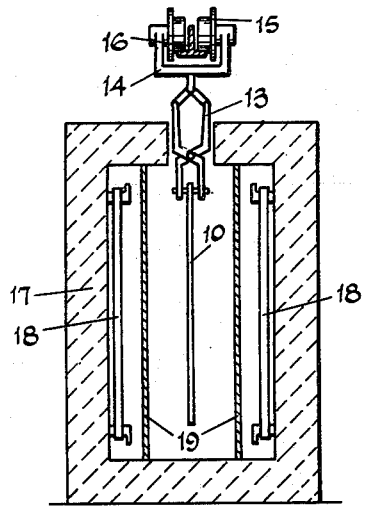
Fig. 2 is a vertical sectional view through a heating furnace which may be used to fire the electrodes on the glass sheet and/or to heat the sheet prior to filming.

Referring now more particularly to the drawings a sheet of glass 10 to be rendered electrically conducting may be provided along opposite margins thereof with suitable electrodes 11. The glass 10 can be ordinary sheet or plate glass of any desired composition, and a number of different materials may be used for the electrodes 11, which can be applied in any convenient manner. For example, electrodes of sprayed copper, sprayed copper alloys, gold, silver and platinum fluxes and combinations of these materials have all been used satisfactorily.

At present, the familiar silver bus bar material appears to be the most satisfactory from all standpoints and it is preferably applied by spraying two marginal portions of the glass sheet with an electrically conducting silver flux in an organic binder, after which the sprayed sheet is heated to fuse the flux onto the glass. The electrodes or bus bars thus formed may then have suitable leads 12 soldered or otherwise electrically connected thereto.

With the electrodes in place, the glass is then ready to be filmed and this is preferably done by first heating the sheet to approximately the softening point of the glass and then subjecting the heated sheet to the action of a tin salt. According to accepted commercial procedures, this may be accomplished by hanging the sheet 10, to which the electrodes 11 have been applied, from tongs 13, which are hung from a carriage 14 provided with wheels 15 to run along a monorail 16. The carriage 14 is moved along the monorail 16 to pass the sheet 10 into and through a tunnel type furnace 17 provided with suitable heating elements 18 and baffles 19 which serve to more evenly distribute the heat over the entire surface area of the glass. If desired, this heating of the glass preparatory to filming can also be utilized to fuse the silver flux to the glass, thus eliminating one heating step.

Figure 3:
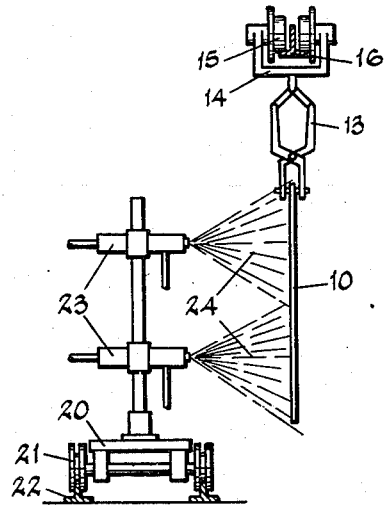
Fig. 3 is an end view of a spraying apparatus for applying the filming material to the heated glass.
Figure 1:
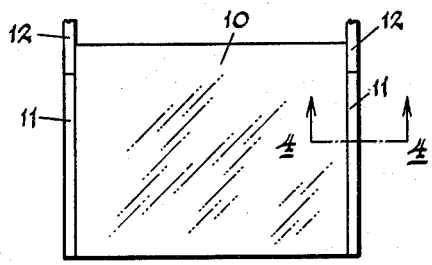
Fig. 1 is a plan view of a glass sheet provided with electrodes along two opposite marginal portions thereof.

In any event, after the sheet 10 has reached a temperature approximating the softening point of the glass, it is removed from the furnace and brought into filming position as shown in Fig. 3. At this point there is arranged a carriage 20, provided with grooved wheels 21 which run on tracks 22, and carrying a bank of spray guns 23. A solution of a tin salt in a suitable vehicle, for example stannic tetrachloride in isopropyl alcohol, is fed to the guns and is sprayed therefrom as shown at 24 onto the surface of the sheet 10. To insure a uniform coating of the spray material, the carriage 20 is reciprocated on the tracks 22 to move the sprays 24 continuously back and forth over the sheet, and this spraying is continued until a clear, transparent, electrically conducting film 25 consisting substantially of tin oxide and of the desired conductivity has been formed.

Figure 4:
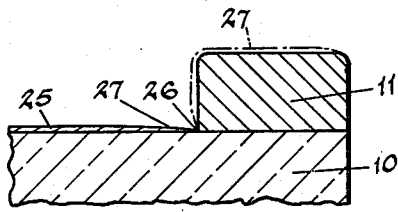
Fig. 4 is a fragmentary sectional view on a greatly enlarged scale taken substantially along the line 4—4 in Fig. 1, after the glass sheet has been filmed.

As can be seen in Fig. 4, the film 25 covers the entire surface of the glass between the electrodes 11 and is in electrical contact with the electrodes at the electrode-film interface or, differently expressed, at the meeting line 26 of the film and electrode. The sprayed film 25 may also extend over the electrodes as shown in broken lines at 27, but it is not definitely known that this is the case. Nor is the exact nature of the film on the electrode, if it does extend thereover, known. As a matter of fact, it may be desirable, in practicing the present invention, to burnish the top surface 28 of the electrode 11 to remove any of the film 27 that has adhered thereto.

However, prior to the present invention, it has been the usual practice to provide glass sheets with electrodes and electrically conducting films connected in the above manner for de-icing purposes; but, as pointed out, considerable difficulty was experienced with these structures due to the arcing which occurred at the meeting line of the electrode and film, or the electrode-film interface, 26.

The precise reason for this arcing is not definitely known, although there are a number of factors that may be responsible. For example, the preferred, fired-on silver flux that is used as the electrode is made up of 65.6% silver, 7.8% flux, 18% organic liquid binder, and 8.54% thinner. The possibility exists that some of the organic binder which this type of silver flux contains, creeps onto the clean glass surface and leaves a carbonaceous deposit at the electrode-film interface. The affinity of the stannic oxide, of which the film substantially consists, for this carbonaceous deposit may be less than the affinity of the stannic oxide for a clean glass surface.

Another possibility arises from the fact that the fired-on type silver also contains a glassy flux which separates from the silver particles of the mixture very readily. It is possible, therefore, that the silver particles tend to collect together leaving an electrode film interface which is rich in glassy flux material.

There is a still further possibility which might conceivably be the cause of the trouble, and that lies in the relative thickness of the silver electrode itself. These fired-on silver electrodes average around .002 of an inch in thickness as compared with a thickness of approximately .00002 of an inch for the electrically conducting film. In other words, the electrode is roughly 100 times thicker than the film and this may cause eddy currents to occur, during filming, at the electrode-film interface.

In any event, upon close scrutiny, it appears from the interference color of the film at the electrode-film interface that the film thins out adjacent the meeting line of the film and electrode as indicated at 27 in Fig. 4. This thin area obviously is a point of weakness when current starts to flow from the electrode into the film and constitutes a weak link in the chain of existing resistances.

But, whatever the actual cause, I have found that this arcing at the electrode-film interface can be eliminated by the provision of a metal overlay along the line of joinder of the electrode and film.

Although the invention is definitely not restricted to any particular metal or metal composition for the overlay, I prefer to use air-dry silver, so-called because it comprises finely divided silver suspended in a vehicle, and dries upon exposure to air, as distinguished from the silver material used in the electrodes which is fired onto the glass.

Figure 5:
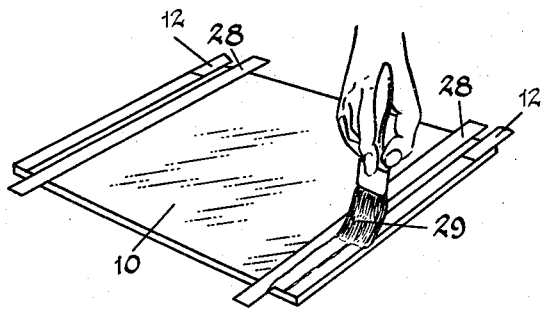
Fig. 5 is a diagrammatic illustration of one method of applying the metallic overlay to the filmed glass sheet.
Figure 6:
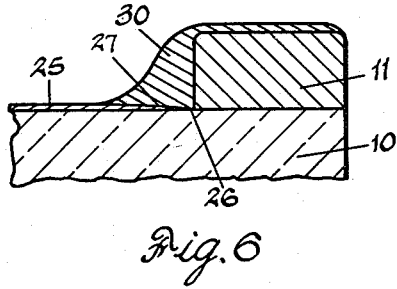
Fig. 6 is a view similar to Fig. 4 after the metallic overlay has been applied.

I have successfully employed a number of the commercially available air-dry silvers, platinums and golds, for this purpose but, in the air-dry silver now being used in production, the mixture contains about 43% silver flakes and around 57% of a lacquer binder. This material may be applied in any desired manner and a preferred method is illustrated in Fig. 5. As there shown, strips of Scotch tape 28 are placed upon the filmed glass sheet, a short distance inwardly from the electrodes 12, to define the area to be coated, and the air-dry silver is then applied by means of a brush 39. The suspension of silver flakes is brushed onto the silver electrode 11, leads 12, and the adjacent portion of the electrically conducting film 25 so that it completely covers the electrode-film interface, or meeting line of the electrode and film, and forms a continuous coating along two opposite margins of the sheet 10 as shown at 30 in Figs. 5 and 6.

It is usually desirable, from the standpoint of appearance, to have the metal overlay extend onto the electrically conducting film 25, from the electrode, only a relatively short distance, but it should completely cover the thin portion 27 of the film so as to bridge the gap between the electrode and the film of full thickness. Because of the difference in height between the film 25 and the electrode 11, when the overlay 30 is applied in the manner just described, it will provide a fillet of metal in the angle formed by the juncture of the film and electrode.

After the silver coating 30 has been applied, the strips of tape 28 are removed and the silver overlay material is dried either in air, or at slightly elevated temperatures in an oven. One advantage of the air-dry silver is that it can be dried or set at temperatures considerably below that at which the electrically conducting film will be adversely affected.

In addition to being quick drying, the air-dry silver forms a tough, tightly adherent, pliable coating that will withstand all ordinary glass cleaning, and which has a resistance of only about 10 ohms per lineal foot in quarter-inch widths.

Following the treatment with the air-dry silver, it is customary to laminate the glass sheets together with another sheet of glass and an interposed layer of non-brittle thermoplastic material to form a laminated safety glass unit. Such a unit, with the electrically conducting film on the inside, has increased strength and shatter-resisting characteristics. Moreover, the electrically conducting film and electrodes are protected, and the possibility of shocks therefrom and short circuits therein, during use, is eliminated.

Heretofore, many failures occurred in filmed glass sheets even when laminated together with another sheet of glass and a non-brittle plastic interlayer, especially when such units were used in aircraft; and the pilots always reported such failures as starting with arcing along the electrode-film interface. This seemed to indicate either a weakness along the meeting line of the electrode and film or an extremely high degree of electrical resistance along that line and, whatever the reason, it seems probable that it was caused, at least in part, or at any rate accentuated, by movement of the electrode and film toward and away from each other upon expansion and contraction of the glass sheet due to the fact that the coefficient of expansion and contraction of the glass and electrode are different from each other and different from that of the glass to which they are adhered.

If and when such a condition exists in a unit constructed according to the present invention, it will be taken care of by the metallic overlay described herein which, because of its pliability will compensate for relative movement between the electrode and film, and effectively bridge any weakness, line of high resistance, or possible rupture at the electrode-film interface resulting therefrom.

In any event, units employing electrically conducting glass produced in the manner described above, and including the metal overlay of this invention have been subjected to very severe tests, and have been put into commercial use in aircraft under rigorous flying conditions with excellent results and without a single failure from arcing at the electrode-film interface.

In lieu of incorporating the electrically conducting glass sheet into a laminated safety glass unit, it may be desirable in some cases to merely coat the filmed surface of the glass with a suitable non-conducting coating material such as plastic. In fact, it is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. The combination with a vitreous article having an electrically conducting film on a surface thereof and an electrode in direct contact with said film for supplying electrical current thereto, of a metallic overlay on said film on the side thereof that is away from said vitreous surface and extending along and bridging the meeting line of said film and said electrode.

2. The combination with a vitreous article having an electrode fixed to one surface thereof and an electrically conducting film also on said surface and in direct contact with said electrode at least at the meeting line of said film and electrode, of a metallic coating on said film on the side thereof that is away from said vitreous surface and over said film and said electrode and covering the meeting line of the film and electrode.

3. The combination with a vitreous article having a relatively thin film of electrically conducting material of relatively high resistivity on a surface thereof and an electrode of relatively greater thickness and lesser resistivity also on said surface and in direct contact with said film, of a fillet of metal on said film on the side thereof that is away from said vitreous surface in the angle formed at the juncture of the film and electrode and covering the meeting line of said film and electrode.

4. The combination with a vitreous article having an electrode fixed to one surface thereof and an electrically conducting film also on said surface and of substantially uniform thickness except for a relatively thin area adjacent said electrode, of a metallic overlay on said film on the side thereof that is away from said vitreous surface and over said film and electrode and bridging the gap between the electrode and the area of the film that is of full thickness.

5. The combination with a sheet of glass having an electrode comprising a metallic flux fired on a surface of said sheet and a transparent electrically conducting film consisting substantially of tin oxide also on said surface and in direct contact with said electrode, of a dried coating of a suspension of finely divided metal in a vehicle on said film on the side thereof that is away from said glass surface and extending along and bridging the meeting line of said film and electrode.

6. The combination with a sheet of glass having an electrode comprising a silver flux fired on a surface of said sheet and a transparent electrically conducting film consisting substantially of tin oxide also on said surface and in direct contact with said electrode, of a dried coating of flake silver in a lacquer binder on said film on the side thereof that is away from said glass surface and extending along and bridging the meeting line of said film and electrode.

7. The combination with a sheet of glass having spaced electrodes fixed on a surface thereof and a transparent electrically conducting film consisting substantially of tin oxide also on said surface and covering an area between said electrodes, of a layer of silver flakes over each of said electrodes and extending therefrom over and onto a portion of said film that is spaced from but adjacent to the electrodes and onto the side of said film that is away from said glass surface.

8. The method of rendering a vitreous surface electrically conducting which comprises fixing electrodes to said surface at spaced positions thereon, heating the surface to substantially its point of softening, subjecting the heated surface to the action of a tin halide in fluid form to form an electrically conducting film thereon, and finally coating the meeting lines of said film and said electrodes with an electrically conducting material.

9. The method of rendering a glass sheet electrically conducting which comprises applying spaced strips of silver flux to a surface of said sheet, heating said surface to substantially the softening point of the glass, exposing the heated surface to the action of a tin compound in fluid form to form a film consisting substantially of tin oxide thereon and in direct contact with said strips, applying a coating of air-dry silver over and along either side of the meeting lines of the film and the electrodes, and then drying said coating.

10. The method of rendering a glass sheet electrically conducting which comprises applying spaced strips of a silver flux comprising substantially 65.6% silver, 7.8% flux, 18% organic binder and 8.54% thinner to a surface of said sheet, heating said surface to substantially the softening point of the glass, exposing the heated surface to the action of a tin compound in fluid form to form an electrically conducting film thereon, applying a coating of air-dry silver comprising substantially 43% finely divided silver flakes and 57% of a lacquer binder over and along either side of the meeting lines of the film and electrodes, and then drying said coating.

ROMEY A. GAISER.

REFERENCES CITED

The following references are of record in the file of this patent:

UNITED STATES PATENTS

| Number | Name | Date |
|---|---|---|
| 2,021,661 | Kisfaludy | Nov. 19, 1935 |
| 2,429,420 | McMaster | Oct. 21, 1947 |
| 2,475,379 | Stong | July 5, 1949 |